(12) United States Patent
Gaster

(10) Patent No.: US 6,284,181 B1
(45) Date of Patent: Sep. 4, 2001

(54) OVER-MOLDED PRODUCT AND METHOD OF MANUFACTURE

(76) Inventor: Ivan Gaster, 201 Richard Ct., Union, OH (US) 45322

( * ) Notice: Subject to any disclaimer, the term of this patent is extended or adjusted under 35 U.S.C. 154(b) by 0 days.

(21) Appl. No.: 09/390,643

(22) Filed: Sep. 7, 1999

(51) Int. Cl.[7] .................................................. B29C 45/14
(52) U.S. Cl. ........................... 264/263; 264/273; 264/274; 264/DIG. 76
(58) Field of Search ................................. 264/263, 273, 264/274, DIG. 76; 425/110, DIG. 99, DIG. 242

(56) References Cited

U.S. PATENT DOCUMENTS

| | | | |
|---|---|---|---|
| 2,366,274 | * 1/1945 | Luth et al. ................... | 18/59 |
| 3,047,703 | 7/1962 | Aske ........................... | 219/19 |
| 4,304,749 | * 12/1981 | Bauer .......................... | 264/263 |
| 4,546,874 | 10/1985 | Kirchhan ...................... | 220/4 B |
| 4,826,598 | * 5/1989 | Cain ........................... | 210/445 |
| 5,794,814 | 8/1998 | Baerenwald ................... | 220/685 |
| 5,846,468 | * 12/1998 | Yagi et al. .................... | 264/268 |

* cited by examiner

Primary Examiner—Jan H. Silbaugh
Assistant Examiner—Edmund H. Lee
(74) Attorney, Agent, or Firm—Reuben Wolk

(57) ABSTRACT

An over-molded product, such as a container, and a method of manufacture. The product is primarily used for enclosing hazardous materials and is formed by utilizing a thermosetting plastic material in a reaction injection molding process at low temperature and pressure to envelop adjacent portions of two or more components to form the desired product. This provides a mechanical interface but avoids a chemical reaction which would degrade the components.

8 Claims, 3 Drawing Sheets

US 6,284,181 B1

OVER-MOLDED PRODUCT AND METHOD OF MANUFACTURE

BACKGROUND OF THE INVENTION

The present invention relates to an over-molded product, that is, a product comprising multiple components fastened together by a molded outer material, and the method of manufacturing such a product.

PRIOR ART STATEMENT

It is desirable to close and seal various products, such as containers having covers. Typical products are disclosed in the patents to Aske, Ser. No. 3,047,703; Kirchhan, Ser. No. 4,546,874; and Baerenwald, Ser. No. 5,794,814. Such containers may be utilized to safely enclose hazardous materials or to prevent leakage into the container. These are provided by using thermoplastic materials as closure systems.

SUMMARY OF THE INVENTION

The product and method of the present invention provides for a new approach to the problem of forming seals for various products, such as containers for waste materials, which is extremely versatile and can be applied to such products for an unlimited number of industrial uses. The process utilizes a thermosetting plastic material primarily composed of a plural component liquid monomer mixture, which can be applied by a reaction injection molded (RIM) process to form an over-molded section around multiple components. The liquid plastic material is introduced into a mold which is positioned around the abutting and adjacent portions of the components at a low temperature and low pressure. A chemically driven exothermic reaction provides the energy necessary to facilitate polymerization of the liquid monomers. The process permits the formation of the over-molded sections in a large range of profile configurations and cross-sections, whether thick or thin. The components to be sealed may be made of plastic materials, composites or metals. A mechanical or physical interface is provided between the components and the over-molding material. The use of these liquid thermosetting plastic materials avoids problems which could exist if conventional injection molding were to be used, wherein it is necessary to melt solid plastic granules at temperatures between 400 and 600 degrees Fahrenheit, and then forcing the melt into mold cavities at pressures that normally run between 12,000 and 16,000 PSI. In such a process, the components to be joined would be seriously degraded. In this process, there is no chemical reaction, and thus a corresponding absence of chemical degradation of the components which would otherwise occur if the process involved molding at high temperatures and/or pressures. In addition, there is no loss of physical integrity, or degradation, such as would occur if high temperatures were involved, which would cause melting and re-solidifying of the components. The process can be utilized for such products as hazardous waste containers, high or low pressure protective containers, pressure vessels, drums, pipe joints, fastening systems, fascia, and the like. The result is a tamper-proof, weather-resistant product.

It is, therefor, a principal object of the invention to form an over-molded product comprising multiple components secured by a thermosetting plastic material.

It is another object to provide a mechanical interface between the components and the plastic material.

It is a further object to apply a liquid plastic material at low temperatures and pressures to maintain the chemical and physical integrity of the components.

These and other objects and features will be apparent from the embodiments described and shown below.

DESCRIPTION OF THE PREFERRED EMBODIMENT

Figure 1:
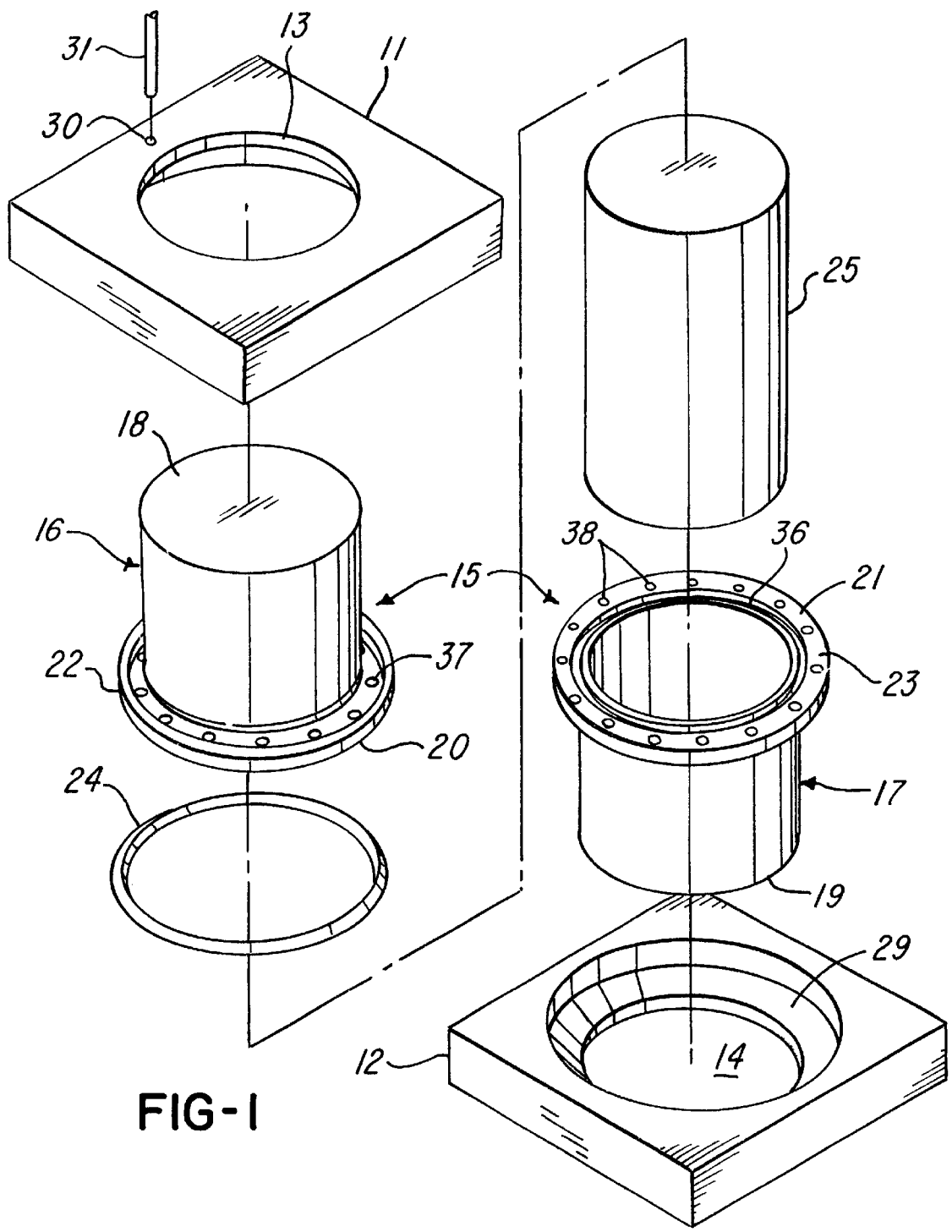
FIG. 1 is an exploded view of typical multiple components and their relation to mold members, prior to the molding step.

Referring now to the drawings, FIG. 1 is an exploded view of a typical arrangement of a mold comprising upper and lower mold members 11 and 12 typically formed of aluminum plates, having central openings 13 and 14 respectively. A typical container 15 is comprised of identical components 16 and 17, shown as being generally cylindrical in configuration, although these could be round, oval, or any other desired shape. The container as shown is metal, but could be made of a plastic material, such as polyvinyl chloride or polyethylene, or a fiber-reinforced composite. The members have closed surfaces 18 and 19 and open surfaces 20 and 21. The open surfaces have outwardly extending flanges 22 and 23 extending completely around the sides of the components. An inner container 25, which contains the waste material (such as hazardous material) that is to be sealed within the container 15, is arranged to be placed between the mold members so that it will be enclosed between the sealed components. A gasket 24, made of a resilient polymeric material, is arranged between the mold members so that it will be utilized during the molding process, as explained below.

Figure 2:
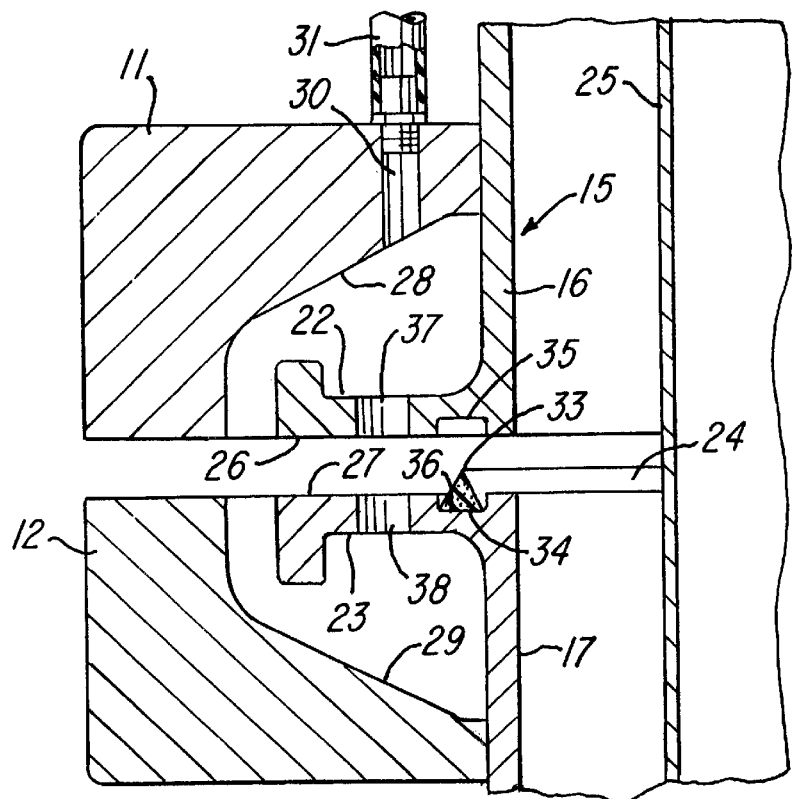
FIG. 2 is a view in partial section, showing the multiple components within the mold members prior to the molding step.
Figure 3:
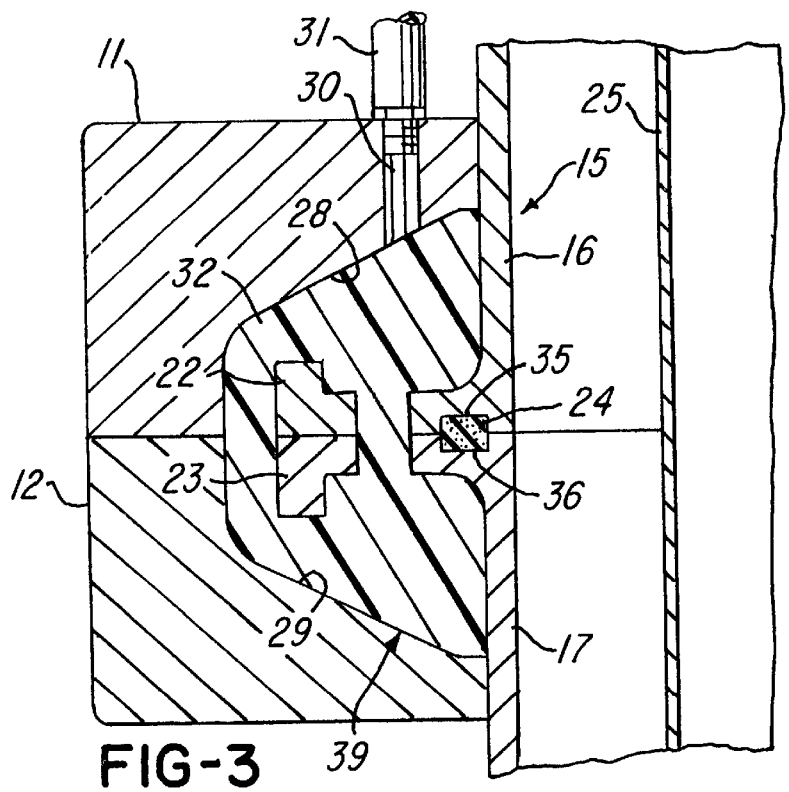
FIG. 3 is a view similar to FIG. 2, showing the components secured by the plastic molding material after the molding step.
Figure 4:
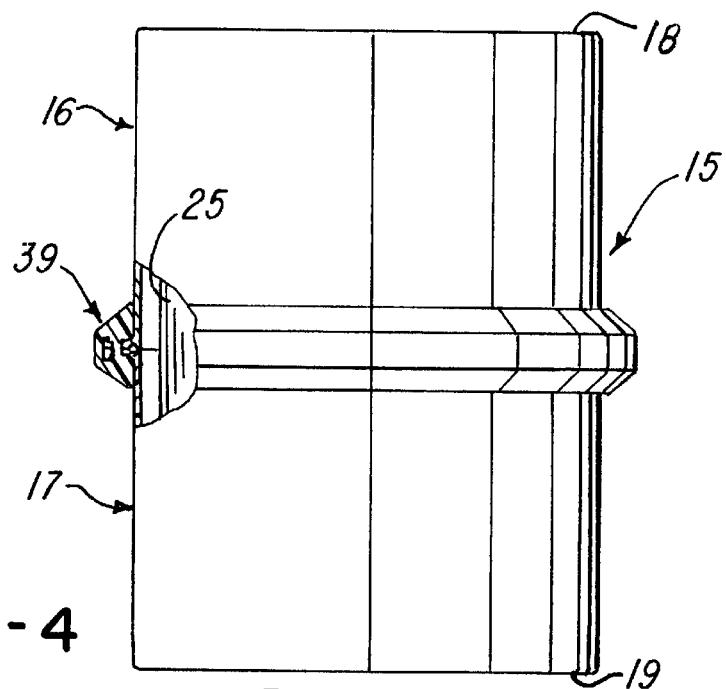
FIG. 4 is a view of the finished product manufactured by the previously shown steps.

The components 16 and 17 are placed together between the mold members as shown in FIG. 2 with the inner container within the components, and a gasket 24 is located and aligned between peripheral grooves 35 and 36 in the mold members. The gasket is formed in a triangular cross-section with an apex 33 and a flat base 34 as shown. A series of spaced openings 37 and 38 are located in the flanged portions 22 and 23 of the components for purposed described below. As shown in FIG. 3, the mold members are clamped together by any suitable means so that the inner surfaces 26 and 27 of the flanges are abutting. The components are held in place within the openings 13 and 14 of the mold members by placing the flanges within the offset portions 28 and 29 of the mold being configured so that openings 13 and 14 of the mold members extends completely around the flanges. The gasket 24 is compressed from its triangular shape to fit within the grooves 35 and 36. The over-molding thermosetting plastic material is introduced into the mold openings to lock the flanges together; the material being introduced through an opening 30 in either mold member. In the illustrated arrangement the opening is in the upper surface of the upper mold member, but may be located elsewhere as convenient. The components 16 and 17 are now secured together by the over-molded material 32 which has been injected into the mold via a hose 31 leading to a supply of the material. The material is now in the form of an outer solid mass of material 39 having a generally U-shaped configuration which envelops the flanges 22 and 23. To provide further locking of the components, the material flows through the holes 37 and 38 in the mold members. It should be understood that the inner container 25 may be configured in other shapes necessary to retain the waste material being secured. It should be further understood that the outer container 15 need not be used to retain an inner container, but may be used in other ways; for example, the components 16 and 17 may be sent to a consumer who will place the waste material, such as effluent from a sewage system, directly in the lower component, then secure the upper component to the lower one in the manner described above, thus forming a complete container The over-molding material is a thermosetting plastic, defined as a plastic material which undergoes a chemical change and hardens permanently when cured or heated in processing, and cannot be re-melted or re-processed. The thermosetting plastics used here are primarily composed of plural component liquid monomer mixtures. The preferred material is known as poly-dicyclo pentadiene, but other thermosetting materials, such as urethane or polyester may be used. The preferred material has a high impact resistance, and also exhibits stability in the presence of gamma radiation, making it particularly important ;when exposed to nuclear waste which the containers may enclose. If desired, other additives, such as colorants, fire retardants, or the like, may be added. While the novel process is similar to conventional reaction injection molding processes (RIM), it differs in that the material is injected at low temperatures, ranging from to 60 to 90 degrees Fahrenheit; and at low pressures below 40 pounds per square inch. This avoids physical and chemical degradation which would occur if higher temperatures and pressures were utilized as in conventional injection molding processes. In particular, it avoids the melting and re-solidifying of components made of a low melting point plastic under high temperatures. The process provides a strong mechanical interface between the components 16 and 17 and the material 32. The completed container 15 is shown in FIG. 4. The monomers normally comprise an activator and a catalyst in equal proportions, which are mixed in a conventional mixing device before placing in the mold.

Figure 5:
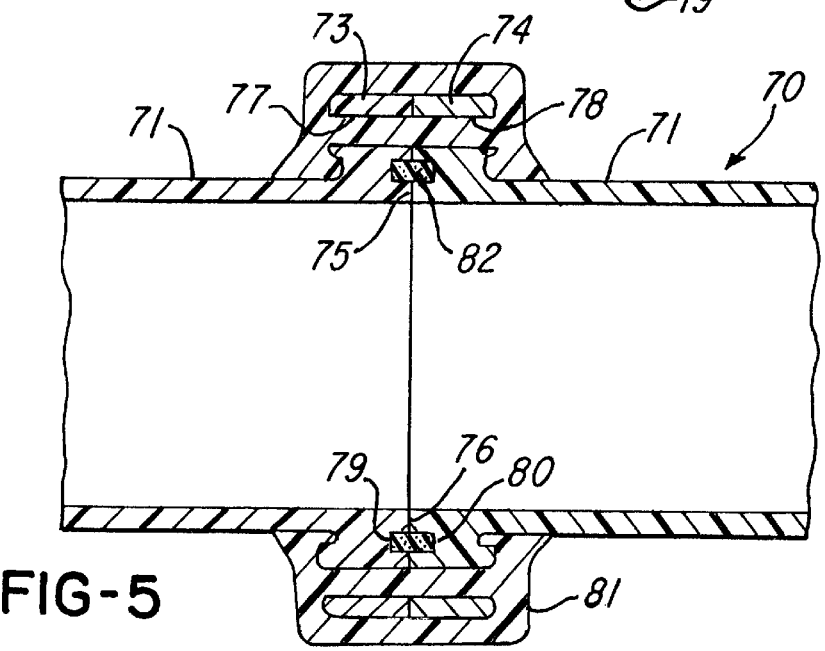
FIG. 5 is a view in section illustrating another product that can be made using the above shown process.
Figure 6:
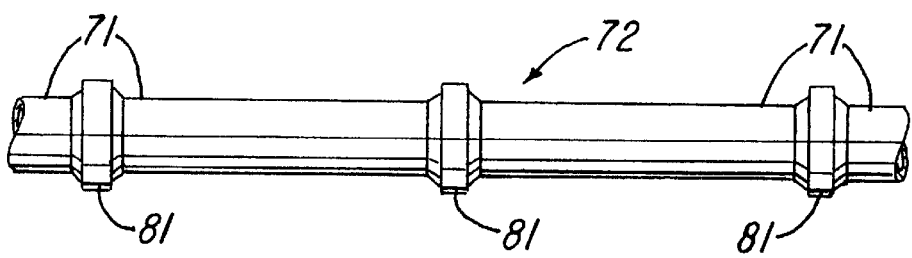
FIG. 6 is view illustrating a further product similar to that of FIG. 5.

FIG. 5 illustrates another use of the novel process, showing how this process may be used in conjunction with other products in addition to the containers illustrated above. The product shown is a pipe assembly designated by reference number 70, and consists of identical fluid transmission pipe sections 71 having integral flanged ends 73 and 74 respectively. The flanged ends are placed within the cavities of mold members which are similar to the mold members described above with respect to the earlier forms of the invention, but specifically designed to fit the flanges. Spaced openings 77 and 78 are located peripherally within the flanged ends and aligned with each other, and the surfaces 75 and 76 of the flanges are abutted. Peripherally extending seals 79 and 80 are located in the abutting ends of the flanges for placement of a seal 80, and the mold halves are clamped together. The thermosetting plastic material 32 is introduced in a manner and under the conditions described above, and flows into the mold openings and around the flanges and through the openings 79 and 80. The result is an over molded member 81 which extends around the flanges 73 and 74 and the end portions of the pipes to provide a finished assembly 70. FIG. 6 illustrates how the pipe sections 71 may be joined together to form a long multiple pipe assembly 72, which may be provided in any length that is practical for shipping. The sections may be joined together as in FIG. 5 by over-molding each of the abutting sections by using a plurality of joints 81. It is contemplated that although the pipes may be made of various materials, one particularly useful pipe material is di-cyclo pentadiene, the same material used as the over-molding material described herein. This material is highly corrosion resistant, and could conduct corrosive waste material with a minimum of corrosion.

The products and processes shown and described above are merely exemplary. Other products and processes are considered to be within the scope of the invention.

I claim:

1. A method of forming an over-molded product comprising multiple components of a low melting point plastic without affecting the chemical and physical integrity of said components; comprising the steps of positioning mold members around a portion of said components, injecting a thermosetting plastic over-molding material at a pressure below 40 pounds per square inch and a temperature ranging from 60°–90° F. between said mold members and said portion of said components to provide a mechanical interface between said portion of said components and said plastic material, and forming said product without a chemical reaction and physical degradation within said portion of said components.

2. The method of claim 1 wherein said plastic material is poly-dicyclo pentadiene.

3. The method of claim 1 wherein said plastic material is urethane.

4. The method of claim 1 wherein said step of introducing said plastic material into said mold members comprises reaction injection molding.

5. The method of claim 1 wherein said components each have generally cylindrical surfaces and comprise outwardly extending members completely around said surfaces, comprising the further step of applying said plastic material around and interlocking said members.

6. The method of claim 5 comprising the further step of passing said plastic material through a portion of said outwardly extending members.

7. The method of claim 1 wherein said components comprise fluid conveying pipes having abutting flanged ends, said step of introducing said over-molding material comprising applying said over-molding material around said flanged ends to interlock said ends.

8. The method of claim 7 comprising the further step of forming said components of the same material as said over-molding material.

\* \* \* \* \*